United States Patent [19]

Ward

[11] 4,318,421
[45] Mar. 9, 1982

[54] FLOAT CONTROLLED SYPHON VALVE FOR SWIMMING POOL COVER

[76] Inventor: Geoffrey A. Ward, 11 Judd Parade, Cheltenham 3192, Victoria, Australia

[21] Appl. No.: 167,738

[22] Filed: Jul. 14, 1980

Related U.S. Application Data

[63] Continuation-in-part of Ser. No. 912,004, Jun. 2, 1978, abandoned.

[30] Foreign Application Priority Data

Jun. 2, 1977 [AU] Australia .............................. 0323/77

[51] Int. Cl.³ ..................... F16L 43/00; F16K 31/20; F16K 33/00
[52] U.S. Cl. ................................. 137/135; 137/409; 137/434; 137/451; 137/238; 4/495; 4/498; 222/67; 222/416; 251/333
[58] Field of Search ............ 4/172.11, 172.12, 172.14, 4/495, 498, 499, 501, 508; 137/131, 137, 403, 409, 451, 429, 430, 433, 434, 238, 408, 448, 135; 251/150, 318, 333, 334; 222/67, 416

[56] References Cited

U.S. PATENT DOCUMENTS

| 301,391 | 7/1884 | Reinecke | 137/135 |
|---|---|---|---|
| 520,146 | 5/1894 | Scanlon | 137/135 |
| 2,623,500 | 12/1952 | Riley et al. | 137/131 |
| 2,664,261 | 12/1953 | Stephany | 251/333 |
| 2,768,645 | 10/1956 | Cohen | 251/333 |
| 3,184,764 | 5/1965 | West | 4/498 |

FOREIGN PATENT DOCUMENTS

| 2705777 | 8/1977 | Fed. Rep. of Germany | 137/433 |
|---|---|---|---|
| 1261336 | 4/1950 | France | 137/433 |
| 639615 | 7/1950 | United Kingdom | 137/448 |

*Primary Examiner*—George L. Walton
*Attorney, Agent, or Firm*—Andrus, Sceales, Starke & Sawall

[57] ABSTRACT

A float controlled valve syphons water out of a swimming pool cover. The syphon valve includes co-operable male and female valve members disposed for mutually relative movement to bring them into and out of mutual engagement to thereby close and open flow communication through a syphon discharge passage formed in the male member. A float body is coupled to one of the said members for effecting the engagement and disengagement in response to the level of the water in the swimming pool cover. The male valve member is tapered at the forward end to facilitate engagement with a central recess in the female member. The female member is formed of more yielding material than the male member and has a thin walled portion receiving the male member and of sufficient flexibility to envelop dirt particles at the male-female member seal.

8 Claims, 3 Drawing Figures

U.S. Patent
Mar. 9, 1982
4,318,421
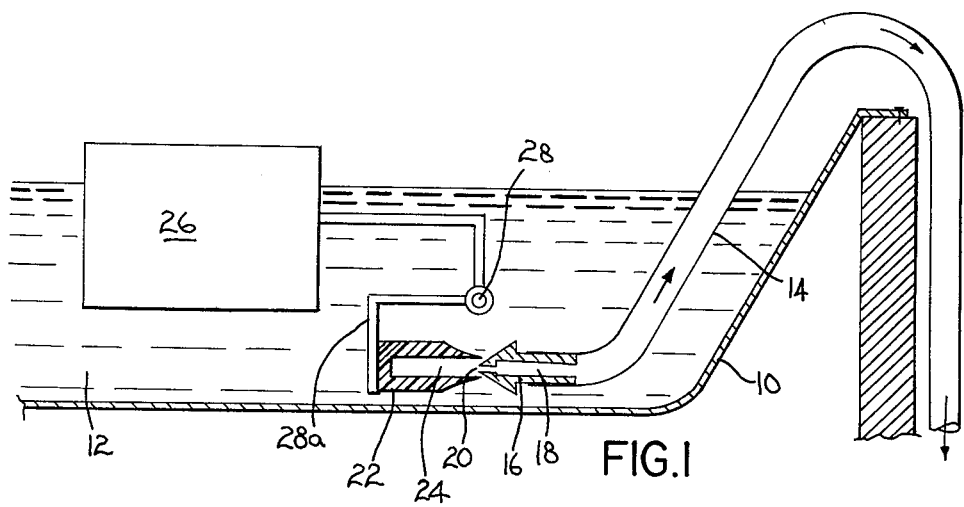
FIG.1
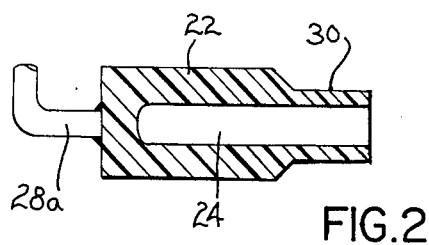
FIG.2
FIG.3
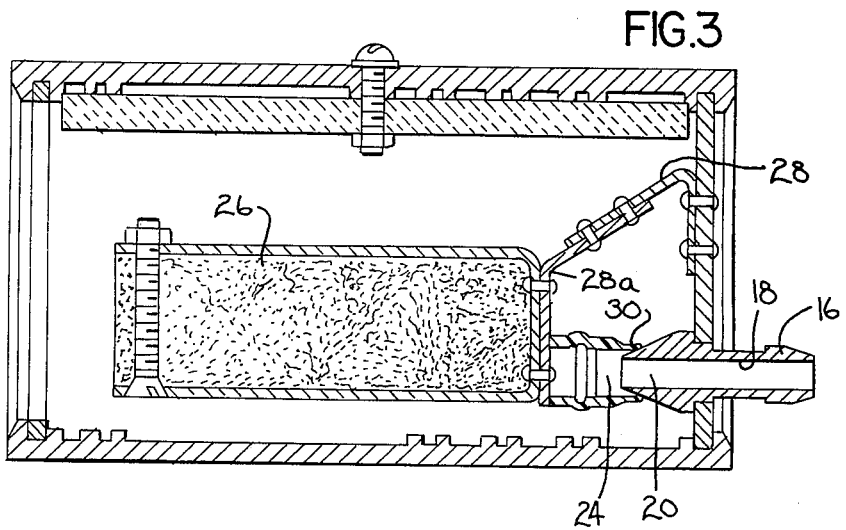

FLOAT CONTROLLED SYPHON VALVE FOR SWIMMING POOL COVER

CROSS REFERENCE TO RELATED APPLICATION

The present application is a continuation-in-part application of U.S. Patent Application, Ser. No. 912,004, filed June 2, 1978 and now abandoned.

BACKGROUND OF THE INVENTION

1. Field of the Invention

This invention relates generally to a float controlled syphon valve for swimming pool covers.

2. Prior Art

Known valves of the type to which the present invention relates typically comprise either a needle valve having guided or precisely machined valve and seat material usually of hard metal, as in the case of a carburettor float valve, or a stop valve in which a disc or other flat faced member is drawn against an orifice of harder material. The float controlled valves of domestic hot water services and toilet cisterns are normally of the second type. It will be appreciated that in both of these forms valve seating action is very sensitive to the intrusion of small particles of dirt or other foreign matter. This problem is particularly acute in applications in which the valve is exposed to the elements. One such application is a syphoning valve used to remove rain water from a flexible swimming pool cover. If such water is not removed but instead allowed to accumulate, then the cover may sag under the weight of the water, resulting in an exposed volume of water presenting the same problems in regard to safety and maintenance as the pool water proper and causing damage to the cover.

SUMMARY OF THE INVENTION

The present invention thus provides a float controlled valve for syphoning accumulated water in the depression of a swimming pool cover out a discharge conduit. The valve includes generally cylindrical co-operable male and female valve members positioned within the depression and below the water level. The members are disposed for mutually relative movement toward and away from each other for inserting and removing the male member in/from the female member to thereby open and close a flow passage formed in the male valve member and connected to the discharge conduit. A float body floats on the water in the cover and is coupled to at least one of the members for effecting said insertion and removal in response to the level of the water while maintaining the syphon.

The male valve member is tapered at the forward end to facilitate insertion in the female member and the female member has a central recess for receiving the male member and for blocking said flow passage. The female member is formed of a more yielding material than the male member. The female member has a first portion remote from the male member which is relatively thick-walled and unyielding for orienting the female member with the male member and a second portion formed by tapering the first portion and surrounding the recess for receiving the male member. The second portion sealingly engages the male member upon its insertion responsive to the action of the float body. The second portion is relatively thin-walled to provide sufficient flexibility to envelop particles of dirt in the area of sealing engagement with the male member.

The float body is preferably attached to the female member.

BRIEF DESCRIPTION OF THE VIEWS OF THE DRAWINGS

The invention will now be further described with reference to the accompanying drawings.

FIG. 1 is a diagrammatic cross-sectional view of a float controlled valve in accordance with the invention disposed in a body of water accumulated on the surface of a swimming pool cover;

FIG. 2 is a detailed cross-sectional view of a part of the valve shown in FIG. 1; and FIG. 3 is a cross-sectional view of a float controlled valve in accordance with this invention.

DETAILED DESCRIPTION

In FIG. 1, a flexible swimming pool cover 10 in position on a pool (not shown) is compressed downwardly by a body of accumulated rain water 12. This water is arranged to be syphoned off in a conventional manner through a flexible line such as a plastics hose or the like 14, which opens into the water through a substantially rigid tapered male member 16. Member 16 defines a flow passage 18 which communicates the hose with the water through a small orifice 20 located at its tapered forward end.

Member 16 constitutes the male member of a float controlled valve in accordance with the invention while a co-operating sleeve 22 constitutes the female member. Sleeve 22 is formed in a flexible and compressible rubber like material and has a central bore 24 closed at one end but open at the other end to receive the male member 16. Both member 16 and sleeve 22 are mounted within an open casing bounded by mesh or otherwise pervious plates shown in FIG. 3.

A float body 26 is disposed to float in the body of water and is coupled to sleeve 22 by a hinging arrangement 28 including a rigid arm 28a secured to sleeve 22. The hinging arrangement is mounted to the casing. The arrangement is such that as the water is syphoned off through the hose 14 and the water level falls, the downward movement of float body 26 causes the sleeve 22 to move towards the male member 16. In due course, sleeve 22 receives the tapered forward end of the male member into its bore 24 until the tapered surface of the former engages the rim of the latter. Water flow then ceases and the disposition of the parts is arranged such that when this occurs, the water line is still above orifice 20 and the syphon is therefore unbroken, and remains for subsequent further draining or accumulation of more water. It will be seen that the described draining arrangement, which utilizes a float controlled valve in a manner converse to its conventional use, will require little or no attention for long periods and yet constitutes a highly satisfactory and reliable means of preventing excess build up of water on a swimming pool cover.

It will be appreciated that by virtue of the male/female coupling employed in the float controlled valve of the invention, the self-centering and sealing action of the valve is more reliable than previously known such valves and is less susceptible to deleterious effects arising from the intrusion of particles of dirt or other foreign matter. The tapering of one of the engaging parts and the formation of one part in a flexible and/or compressible material further aids this improved performance.

FIG. 3 shows a modification of the sleeve 22 of FIG. 1 in which the forward end of the sleeve is rebated to provide a very thin annular portion 30 about that part of bore 24 which receives the male member 16. This portion 30 is capable of enveloping any intruding particles of foreign matter and thus additionally lessens the risk arising from such particles to the reliability of the sealing action.

It is preferred that the taper extend over at least ⅛th of an inch and that the taper is to a thickness of 1/32 of an inch or less.

In a preferred instance a thickness of 1/32 of an inch or less, preferably about 1/64 of an inch was maintained over ¼ of an inch. A particular example of this is shown in FIG. 2.

A specific construction of a valve in accordance with FIG. 1 is shown in FIG. 3 in which the elements are enclosed in a perforated casing. Elements of the valve shown in FIG. 3 corresponding to those of FIG. 1 have been identified by the same reference numerals.

It will be further appreciated that the invention is in no way limited in scope to features or aspects described in detail above but extends to include in its ambit all novel features and combinations of novel features herein disclosed.

Various modes of carrying out the invention are contemplated as being within the scope of the following claims particularly pointing out and distinctly claiming the subject matter which is regarded as the invention.

I claim:

1. A float controlled syphon discharge valve for syphoning dirt containing accummulated water in the depression of a swimming pool cover out a syphon discharge conduit extending into the cover depression below the level of the accumulated water, said valve comprising generally cylindrical co-operable male and female valve members positioned within the depression and below the water level, said members being disposed for mutually relative movement toward and away from each other for inserting and removing the male member in and from the female member to thereby open and close a syphon discharge passage formed in said male valve member and connected to the discharge conduit; and a float body floating on the water and coupled to at least one of said members for effecting said insertion and removal in response to the level of the water, wherein the male valve member is tapered at the forward end to facilitate insertion in the female member and wherein the female member has a central recess closed at one end for receiving the male member and for blocking said syphon discharge passage, said female member being of a more yielding material than the male member and having a first portion remote from the male member which is relatively thick-walled and unyielding for orienting the female member with the male member and a second portion formed as a taper from said first portion to surround said recess for receiving the male member and sealingly engaging same upon its insertion responsive to the action of the float body, said second portion being relatively thin-walled to provide sufficient flexibility to envelop particles of dirt in the area of sealing engagement with the male member and to wipe away the particles of dirt from the area of sealing engagement.

2. The float controlled syphon discharge valve as claimed in claim 1 wherein said float is coupled to said female member.

3. The float controlled syphon discharge valve as claimed in claim 1 wherein said female member has a central recess of uniform dimension transverse to the movement of said members for receiving the male member and for blocking said flow passage by sealingly engaging said male member upon its insertion.

4. The float controlled syphon discharge valve as claimed in claim 3 wherein said second portion of said female member is of smaller dimension than said first portion transverse to the movement of said members and surrounds the opening of said recess, said female member having a tapered portion intermediate said first and second portions.

5. The float controlled syphon discharge valve as claimed in claim 1 wherein said second portion has an axial length of at least ⅛th of an inch and a wall thickness of 1/16th of an inch or less.

6. The float controlled syphon discharge valve as claimed in claim 1 wherein said float and male and female valve members are enclosed in a casing.

7. The float controlled syphon discharge valve as claimed in claim 1 wherein said float is so coupled to said member as to maintain the syphon action.

8. The float controlled syphon discharge valve as claimed in claim 1 wherein said float controlled syphon discharge valve is located in a depression of a swimming pool cover.

* * * * *